United States Patent Office.

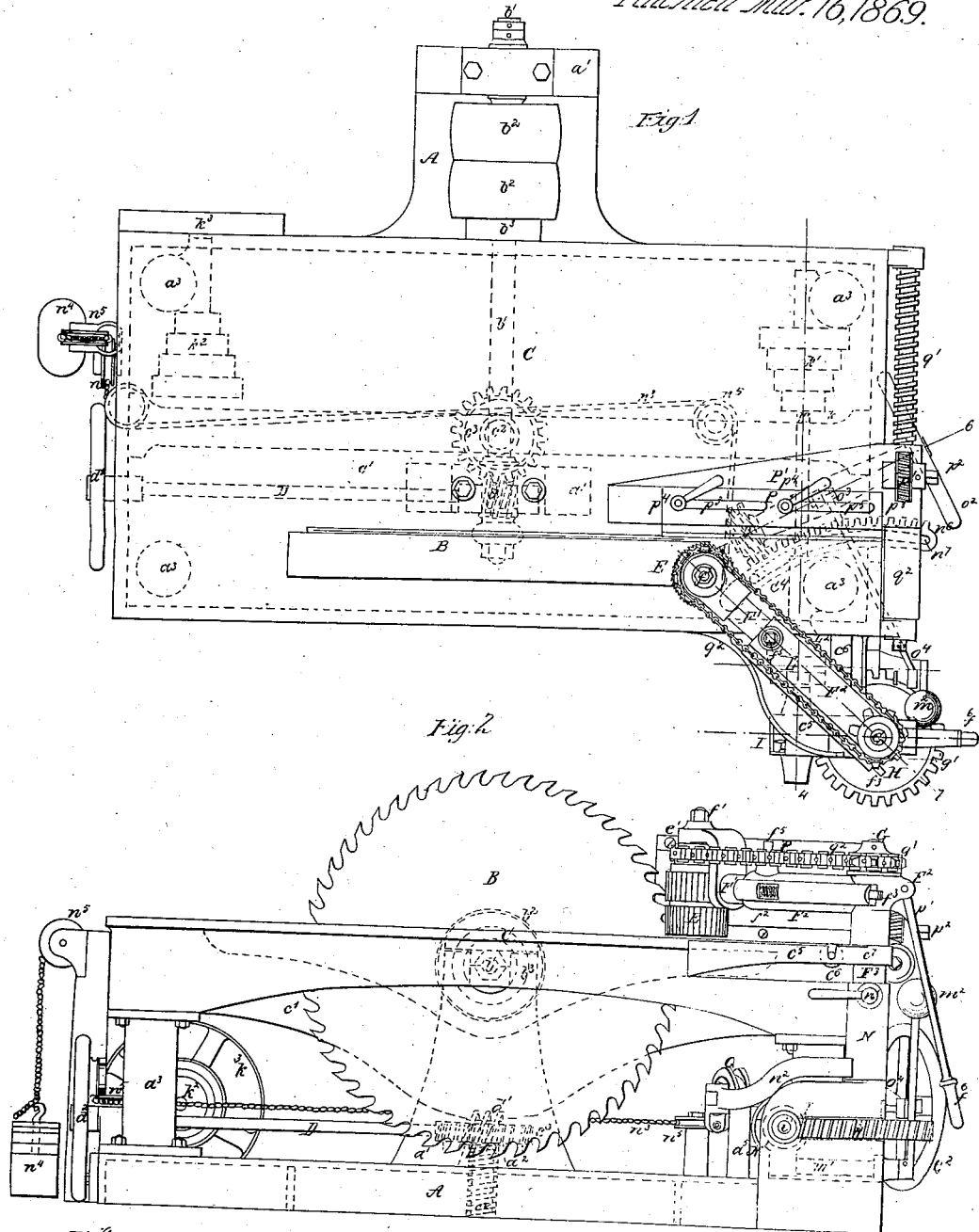

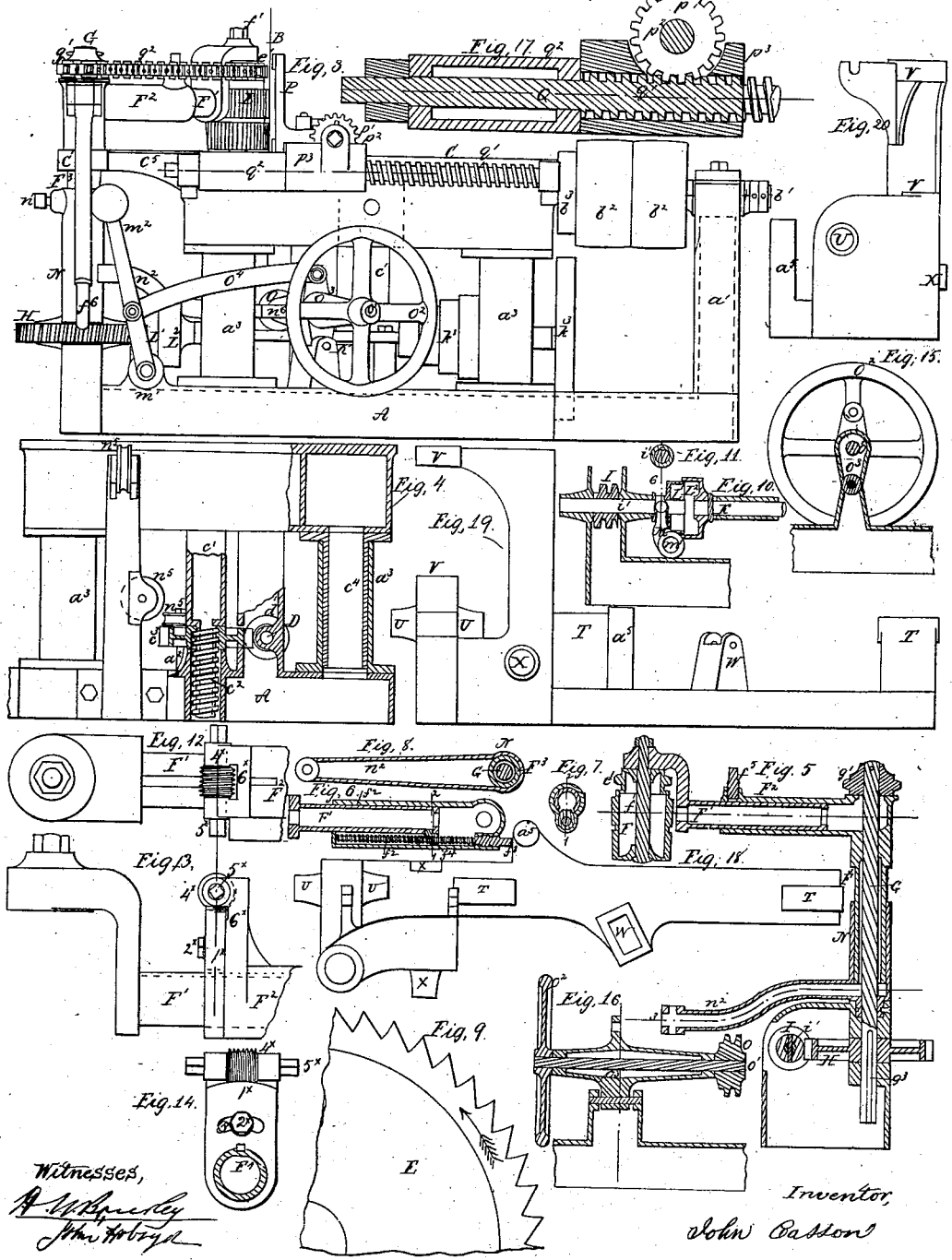

JOHN CASSON, OF PARISH OF SHEFFIELD, ENGLAND.

Letters Patent No. 87,908, dated March 16, 1869.

IMPROVEMENT IN SAWING-MACHINE.

The Schedule referred to in these Letters Patent and making part of the same.

*To all to whom it may concern:*

Be it known that I, JOHN CASSON, of No. 10 St. James's street, in the parish of Sheffield, in the county of York, England, mechanical draughtsman, a subject of the Queen of Great Britain, have invented or discovered new and useful "Improvements in Machinery for Sawing Wood;" and I, the said JOHN CASSON, do hereby declare the nature of the said invention, and in what manner the same is to be performed, to be particularly described and ascertained in and by the following statement thereof; that is to say—

My invention relates more especially to that class of machinery for sawing wood, in which a circular saw is used; and My said invention consists in the following arrangement and construction of parts, whereby the wood to be sawn is fed to the saw continuously, (that is to say, without the necessity for stopping or reversing the machinery,) and the top of the bench is rendered capable of vertical adjustment.

The saw is carried by a spindle, turning in bearings affixed to standards, which are cast upon the bed-plate of the machine, the upper portion of the saw passing through a slot in the top of the bench, as usual.

The said top can be raised or lowered, as required, (according to the nature of the work to be done,) by means of a screw formed on a rib affixed to the under side of the said top, which screw passes through a female screw, formed in a worm-wheel, the under edge of which bears against the upper edge of a socket on the bed-plate, through which the said screw passes.

The said wheel is turned, by means of a worm, on a shaft, furnished with a hand-wheel.

Cylindrical legs, or plungers are affixed to the under side of the top of the bench, which plungers slide in tubular guides, bolted to the bed-plate, and thereby steady the said top at any height to which it is brought.

The wood is fed to the saw by means of a single continuously-revolving grooved roller, of a slightly conical form, (inverted,) between which roller and the fence the said wood is carried forward to the saw.

The said roller turns on an axis, carried by a horizontal arm, formed in two parts, one of which slides telescopically within the other, so that the said arm can be extended when a small saw is used, and contracted when a large saw is used, the adjustment of the said arm being effected by means of a nut-and-screw arrangement, which admits of the axial motion, in its socket, of that part of the arm which carries the feed-roller, so as to set the said roller in an oblique position.

The said socket is formed on a vertical tubular shaft, which turns in a bearing affixed to or cast on the side of the saw-bench, and passes through another tubular shaft, furnished with an arm, to the free end of which a weighted cord or chain is attached, the inner tubular shaft being capable of a rising-and-falling motion within the outer tubular shaft, by which arrangement the arm carrying the feed-roller can be raised to any height to suit the height of the top of the bench, being fixed at such height by means of a set-screw passing through the outer tubular shaft, and is caused to press the feed-roller forcibly against the wood, which is both guided and carried forward by the said roller.

The weighted arm referred to carries a toothed quadrant, which receives motion from a worm on a shaft, which is turned, as required, by means of a hand-wheel, the said worm being so arranged as to be capable of being thrown into and out of gear with the said quadrant, by means of a rocking standard and weighted lever.

In order to introduce the wood between the fence and the feed-roller, the worm and quadrant above referred to are thrown into gear, and the hand-wheel is turned until the feed-roller is brought (by the arm and shaft hereinbefore referred to) to the requisite distance from the fence.

The wood is then introduced, and the quadrant and worm being thrown out of gear, the weight comes into action, and the feed-roller is pressed against the wood.

The said roller is driven by a strap or chain passing over pulleys, one of which is fixed on the axis of the said roller, the other being keyed to the upper end of a shaft, which I will call the central shaft, which passes through the inner tubular shaft hereinbefore referred to, and also through a worm-wheel, to which the said central shaft is connected, by means of a groove-and-feather arrangement.

The said wheel is driven by a worm on a shaft, which receives motion, by means of band-pulleys, from the saw-spindle.

The feed-roller, and parts carrying the same, can be removed, when cross-cutting, or other work requiring a clear bench, has to be done.

The improved feed-apparatus, hereinbefore described, is capable of separate application to the benches of ordinary sawing-machinery.

When so applied, the said apparatus is mounted on a separate bed-plate, which can be fixed underneath the saw-bench to which the said apparatus is applied.

Having now described the nature of my invention, I will proceed to describe the manner in which the same is to be performed, reference being had to the drawing hereto annexed, and to the letters and figures marked thereon.

Figure 1 represents, in plan, machinery constructed according to my invention.

Figures 2 and 3 are side and end elevations, respectively, of the said machinery, showing the means of raising the top of the saw-bench.

Figure 4 is an end elevation, partly in section, of a portion of the said machinery.

Figure 5 is a vertical section, taken on the lines 7 and 8, fig. 1, of the feed-roller, and arms and shafts in connection therewith.

Figure 6 is a horizontal section, taken on the line 1, fig. 7, of the telescopic arm, which carries the said feed-roller, and Figure 7 is a transverse section of the said arm, taken on the line 2, fig. 6.

Figure 8 is a horizontal section, taken on the line 3, fig. 5, and

Figure 9 represents, in plan, a portion of the feed-roller, having grooves, or teeth of the form which I find to answer best, when friction-rollers are not used in the fence.

Figures 10 to 20, both inclusive, represent sundry details, hereinafter referred to.

The same letters of reference indicate the same parts in all the figures.

A is the bed-plate of the machine.

B is the saw, which is mounted on a shaft, $b^1$, turning in bearings, affixed to standards $a^1$ $a^1$, cast on the bed-plate A.

$b^2$ $b^2$ are band-pulleys, by one or other of which the said spindle is driven.

C is the top of the saw-bench, having a rib, $c^1$, on its under side, which said rib carries a screw, $c^2$, which passes through and engages with a female screw, formed in a worm-wheel, $c^3$, the under edge of which bears against the edge of a socket, $a^2$.

D is a shaft, having at one end a worm, $d^1$, which engages with a worm-wheel, $c^3$, and at the other end a hand-wheel, $d^2$, by means of which the said shaft can be turned as required.

$a^3$ $a^3$ are cylindrical guides, in which slide legs or plungers $c^4$, one of which is shown in fig. 4.

E is the grooved conical roller, between which and the fence the wood is carried forward to the saw.

When friction-rollers are not used in the fence, I prefer to make, on the said roller, grooves, or teeth, of the form represented in fig. 9, but when friction-rollers are used in the fence, the grooves on the said roller may be of the ordinary form.

I prefer to form the sides of the said roller with a slight curve downward, and also to form an annular groove in the said roller, as represented, in order to give it a better hold on the wood, but the sides of the said roller may be made straight, and the said groove may be dispensed with.

The said roller turns on an axis, $f^1$, carried by the arms $F^1$ $F^2$.

The part $F^1$ of the said arm slides in the part $F^2$, which latter is formed on a tubular shaft, $F^3$, which turns in a bearing, $c^7$, in a bracket, $c^6$, fixed to or cast on the top of the saw-bench.

$c^5$ is a friction-roller, turning in bearings in the said bracket.

The part $F^2$ carries a screw, $f^2$, which engages with a screw-box, $f^4$, carried by the part $F^1$, and has a square head, $f^3$, by means of which it can be turned as required.

The screw-box $f^4$ is so fitted to the part $F^1$ as to allow of a little play, (see fig. 7,) so that the feed-roller can be set in an oblique position.

$f^5$ is a set-screw, by means of which the part $F^3$ can be fixed in any position to which it may have been brought by the screw-arrangement above described.

Figs. 12, 13, and 14, represent in plan, side elevation, and end elevation, (partly in section,) respectively, an alternative arrangement for effecting the axial adjustment of the arm $F^1$.

In this arrangement, $1^\times$ is a plate, having worm-teeth in its upper part. This plate is connected to the arm $F^1$ by means of a groove-and-feather arrangement, which allows of the sliding motion of the said arm.

The plate $1^\times$ is steadied by means of a set-screw stud, $2^\times$, which passes through a slot, $3^\times$, in the said plate.

$4^\times$ is a worm, affixed to an axis, $5^\times$, which turns in a bracket, $6^\times$, on the arm $F^2$.

This worm engages with the teeth on the plate $1^\times$, so that, by turning the said worm, the said plate, and the arm $F^1$ and feed-roller E, can be brought to the angle required.

G is a shaft, on which is keyed a sprocket-wheel, $g^1$, the motion of which is transmitted to the roller E by a pitch-chain, $g^2$, passing over a sprocket-wheel, $e^1$, formed on the said roller.

The shaft G turns in the shaft $F^3$, and is driven by a worm-wheel, H, furnished with a rib, or a pin, which engages in a slot, $g^3$, in the said shaft, so that it can be slidden to any required height within the said wheel, and will still be in gear therewith.

The worm-wheel H is driven by a worm, I, carried by a shaft, $i^1$, which is thrown into and out of gear with a shaft, K, by means of a friction-clutch, $L^1$ $L^2$, which said clutch, with the parts in connection therewith, is represented in vertical longitudinal section, (partly in elevation,) in fig. 10.

Fig. 11 is a transverse section of the shaft $i^1$, showing the manner of its connection to the clutch-box $L^1$. The section, fig. 10, is taken on the line 4, fig. 1.

The part $L^1$ of the said clutch is connected to the shaft $i^1$ by means of a groove-and-feather arrangement, which admits of the said part being slidden on the said shaft, and the part $L^2$ is affixed to the shaft K.

The part $L^1$ is worked by means of a fork, M, carried by a shaft, $m^1$, (shown dotted in fig. 2,) furnished with a weighted lever, $m^2$, the position of which is indicated by the line 6, fig. 10.

The shaft K is driven from a band-pulley, $b^3$, by means of band-pulleys, $k^1$ $k^2$ $k^3$.

N is a tubular shaft, within which the shaft $F^3$ can be slidden to any required height, being fixed at such height by means of set-screw $n^1$.

The shaft N carries an arm, $n^2$, to the free end of which a chain, $n^3$, is attached.

A weight, $n^4$, is hung to the said chain, which passes over pulleys $n^5$ $n^5$.

The weighted arm $n^2$ carries a toothed quadrant, $n^6$, having a slot, $n^7$, through which passes a pin, $a^4$, (fixed in a pillar, $a^5$,) by which the said quadrant is steadied.

Motion is communicated to the quadrant $n^6$, (when required,) by means of a worm, O, mounted on a shaft, $o^1$, which is furnished with a hand-wheel, $o^2$, and turns in bearings in a rocking standard, $o^3$.

This portion of the machinery is shown separately, in transverse section in fig. 15, and in vertical longitudinal section, (taken on the line 6, fig. 1,) in fig. 16.

The rocking standard $o^3$ is connected, by means of a link, $o^4$, to the weighted lever $m^2$, hereinbefore referred to.

$f^6$ is a lever, by means of which the feed-roller E can be quickly brought out of contact with the wood, when it is wished to do so without throwing the worm O out of gear.

The lever $f^6$ is jointed to the arm $F^2$, so as to hang down out of the way, when not in use.

P is the fence, which is mounted on a saddle, $P^1$, being held thereto by lock-nuts, $p^1$ $p^1$, which pass through slots, $p^2$ $p^2$, in the said fence, and engage in cross-slots in the said saddle.

By this arrangement, the said fence can be adjusted according to the size of the saw used, and can also be slidden off the saddle $P^1$, at right angles therefrom, when a clear bench is required.

The said fence is moved nearer to or further from the saw, (according to the thickness of the wood to be sawn,) by means of a screw, $q^1$, formed on a shaft, Q, which said screw engages with a worm-wheel, $p^3$, carried by an axis, $p^4$, turning in bearings in a sleeve, $p^5$, formed on the fence P.

The part of the shaft Q which is not screwed, forms an axis, on which is mounted a friction-roller, $q^2$, which supports the wood as it is fed to the saw.

The shaft Q, and the parts in connection therewith, are represented in longitudinal vertical section in fig. 17.

The ends of the shaft Q and axis $p^2$ are squared, to receive a winch.

When it is required to adjust the position of the fence with accuracy, the shaft Q is turned, and the screw $q^1$ gears with the locked worm-wheel $p^1$.

When, however, it is required to move the fence a considerable distance toward or from the saw, the axis $p^2$ is turned, and the wheel $p^1$ gears into the screw $q^1$, as into a rack.

The action of the machinery is as follows:

The fence P, having been adjusted to the required position, the hand-wheel $o^2$ is turned until the feed-roller E has been brought back sufficiently far to admit of the introduction of the wood between the said roller and the fence.

The wood, having been introduced, the lever $m^2$ is reversed, so as to throw the shafts $i'$ and K into gear, and the worm $o$ and quadrant $n^6$ out of gear.

The feed-roller is thus caused to revolve, and to press against the wood, and feed it to the saw. The said feed-roller, having a slightly conical form, (the smaller end of the said roller being downward,) presses the wood down upon the top of the saw-bench, and prevents the said wood from rising, or "climbing," from the said bench-top, and thereby insures a steady, continuous feed to the saw, notwithstanding any slight inequalities which there may be in the thickness or form of the wood.

When a deal, or batten, is being sawn into boards or scantlings, the remainder of the deal, or batten, is passed back over the friction-roller $c^5$, after each cut, and is reintroduced between the feed-roller and the fence.

If the wood which is being sawn, is too bulky to admit of its being passed back underneath the arm $F^1 F^2$, the said arm is held back out of the way by means of the lever $f^5$.

When the parts constituting the feed-motion are to be applied to any existing sawing-machine, they are mounted on a casting, represented in figs. 18, 19, and 20.

Figs. 18, 19, and 20, represent, in plan, side elevation, and end elevation, respectively, a bed-plate, having bearings cast thereon, which said bed-plate is to be fixed under the said saw-bench.

T T are the bearings in which the shaft K turns;

U U are the bearings in which the shaft $i'$ turns;

V V are the bearings in which the shafts $F^3$ and N turn;

W is the bearing in which the rocking standard $o^5$ turns;

X X are the bearings in which the shaft $m^1$ turns; and $a^5$ is the pillar in which the guide-pin $a^4$ is screwed.

The feed-apparatus, hereinbefore described, may be applied to ribbon, or band-saws, and to deal-frames.

These applications of the said apparatus will be understood from the description hereinbefore given of the application of the said apparatus to a circular saw.

Having now described the nature of my invention, and the manner in which the same is to be performed, I wish it to be understood that I do not limit myself to the precise details hereinbefore described, and illustrated in the accompanying drawing, as the same may be varied, without departing from the nature of my invention; but

I claim, as my invention—

1. The revolving conical feed-roller, for feeding and guiding wood to circular and other saws, mounted and adjusted in the manner herein described, between which roller and the fence the wood is guided to the saw, as and for the purposes shown and set forth.

2. The toothed quadrant, and gearing connected therewith, in combination with the feed-roller, under the arrangement substantially as described, whereby said roller may be brought to and fixed at any required distance from the fence, as hereinbefore shown and set forth.

JOHN CASSON.

Witnesses:
H. W. BRIERLEY,
J. W. BAKER.